Sept. 13, 1966  H. H. AVERY  3,272,080
TORQUE DRIVE MECHANISM
Filed Sept. 20, 1963  5 Sheets-Sheet 1

INVENTOR.
HAZELTON H. AVERY
BY Edward C. Sheedy
HIS ATTORNEY.

Fig. 3.

Sept. 13, 1966  H. H. AVERY  3,272,080
TORQUE DRIVE MECHANISM
Filed Sept. 20, 1963  5 Sheets-Sheet 4

INVENTOR.
HAZELTON H. AVERY
BY Edward C. Ohrusly
HIS ATTORNEY.

United States Patent Office 3,272,080
Patented Sept. 13, 1966

3,272,080
TORQUE DRIVE MECHANISM
Hazelton H. Avery, Clarks Hill, Ind., assignor of one-half to Rush Metal Products, Inc., Lafayette, Ind., a corporation of Indiana
Filed Sept. 20, 1963, Ser. No. 310,224
13 Claims. (Cl. 91—186)

My invention relates to a new and useful improvement in a torque drive mechanism and more particularly to a drive mechanism for developing a heavy output torque on a shaft, which mechanism is reversing and self-locking with a minimum gyrational effect.

A principal object of my invention is in the provision in a mechanism of this character of an arrangement of parts whereby a pure force couple is achieved between a plurality of drive members geared to a driven shaft.

A further object of my invention is in the provision in a mechanism of this character of an arrangement of cycling plates angularly disposed through 180° with respect to each other, and adapted for circular movement in the same direction about a driven shaft to which they are geared.

Another object of my invention is in the provision in an apparatus of this character of a plurality of driving devices equally spaced about a driven shaft with each device operatively connected by means of cycling plates to the shaft so as to cause rotation thereof upon actuation of the driving devices. Each of the driving devices is adapted to exert a force action in one direction against certain of the cycling plates and an equal and opposite force action against certain other of the cycling plates resulting in a pure drive coupling between the cycling plates and the driven shaft.

Yet another object of my invention is in the provision in a mechanism of this character of a plurality of driving cylinders with each cylinder operating upon a plurality of cycling plates which plates are internally geared to a driven shaft which is in turn rotated at a velocity that is directly proportioned to the actuation of each of the cylinders, and the rotational cycle of the plates.

An equally important object of my invention is in the provision in a mechanism of this character of a plurality of drive cylinders each of which is operated through a valve and switching device which is timed to switch rapidly at the top and bottom dead-center of the piston travel.

Other objects will appear hereinafter.

The invention consists in the novel combination and arrangement of parts to be hereinafter described and claimed.

The invention will be best understood by reference to the accompanying drawing showing the preferred form of construction, and in which.

The torque drive mechanism as disclosed by the drawings hereof illustrate one form of the torque drive mechanism that could readily be employed in prime movers. The principle of operation without departing from the teachings of this invention could be readily adapted to apparatuses requiring extremely large drives such as ships, mill rolls, propeller shafts, and the like. An apparatus embodying the principles of this invention could be incorporated in associated mechanisms requiring differentials, including instant reversing, speed control and locked-in positioning.

Figure 1:
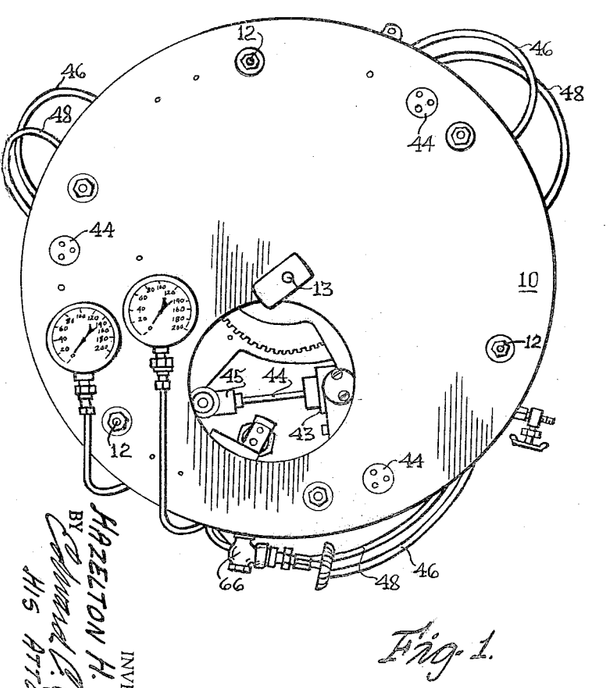
FIG. 1 is a front elevational view of a heavy torque drive mechanism embodying my invention.
Figure 5:
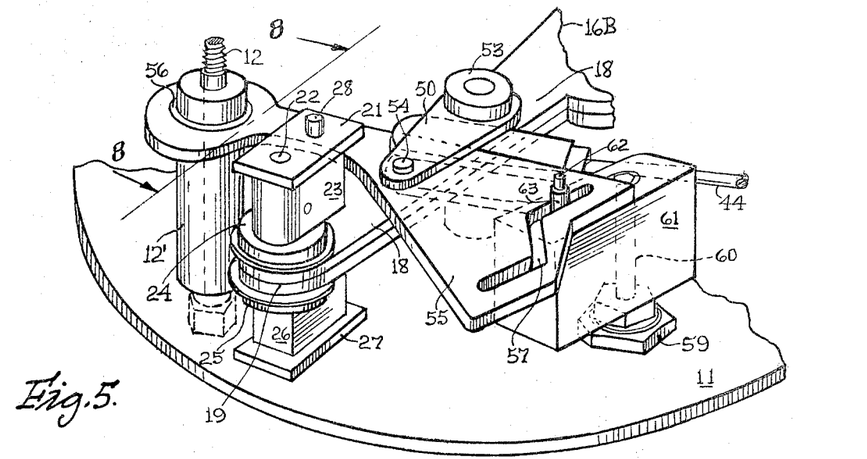
FIG. 5 is a fragmentary perspective view of a crank arm and pin connection.

Referring to FIG. 1, the embodiments of my invention are positioned within a housing comprising a front plate 10 which is connected to and spaced from a back plate 11 by means of nuts and bolts 12. The plates 10 and 11 are maintained in parallel relation by spacers 12' journaled upon the bolts 12 as seen in FIG. 5. Extending through the center of each of the plates 10 and 11 is a driven shaft 13. This driven shaft 13 may be of any size or length and in some applications may be hollow so as to receive therein an independent drive shaft (not shown).

Figure 9:
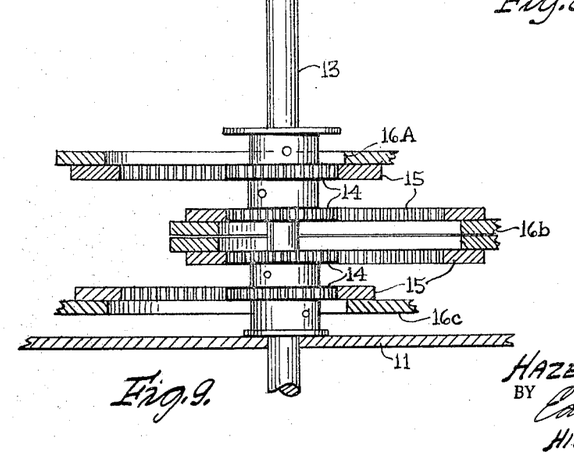
FIG. 9 is a detailed sectional view taken on line 9—9 of FIG. 3.

Fixedly keyed to the shaft 13 between the plates 10 and 11 is a set of pinion gears 14 longitudinally spaced from each other as seen in FIG. 9. These pinion gears 14 are adapted to have geared engagement with circular rings 15 which are internally geared, as shown in FIG. 9. These gear rings 15 are connected by means of screws 16 or the like about the peripheral edge of the center openings formed in the hubs of each of the plurality of spaced juxtaposed cycling plates 16a, 16b, and 16c.

In the embodiment shown in the drawings three such cycling plates are illustrated. Each of the cycling plates 16a, 16b, and 16c, provide radial arms 17 extending tangentially with respect to the hubs thereof. The top cycling plate 16a, and the bottom cycling plate 16c are positioned about the shaft 13 in a manner that the radial arms 17 thereof extend in the same direction. The center cycling plate 16b is interposed between and in spaced relation to the top and bottom cycling plates and has its radial arms 17 extending in opposite direction. In this respect, the top plate 16a, and the bottom plate 16c, is 180° out of phase with the center cycling plate 16b. This for a reason hereinafter made apparent.

The radial arms 17 of each of the cycling plates are adapted to terminate into an angled connecting link 18. The free ends 19 of these connecting links 18 are pivotally connected to rotating crank plates which in turn are pivotally connected to the front and rear plates 10 and 11.

Referring specifically to FIG. 5, I show the means affording the pivotal connection between the free end 19 of the link 18 of the middle cycling plate 16b and its associated pivotal crank plates 21 and 27. This connecting means consists of a top crank plate 21 which is pivotally journalled on a stud 22 which extends through a spacer block 23, washer 24, and the free end 19 of the center cycling plate 16b. A corresponding washer 25, spacer block 26, and bottom crank plate 27, are journaled on the stud 22 on the opposite side of the free end 19 of the connecting link 18 of the middle cycling plate 16b. The pivotal crank plate 21 is connected to its corresponding spacer block 23 and washer 24 by a pivot pin 28, while the lower pivotal crank plate 27 is independently connected to its washer 25 and spacer block 26 by means of a pivot pin 29.

The pivot pin 28 has a free end which is adapted to project through an aligned aperture formed in the top plate 10 while the free end of the pivot pin 29 is adapted to extend through a suitable aperture 30 formed in the rear plate 11.

By this arrangement the free end 19 of the middle cycling plate 16b is pivotally connected to a rotatable crank assembly which in turn is pivotally supported by the front and rear cover plates 10 and 11.

Figures 6, 7:
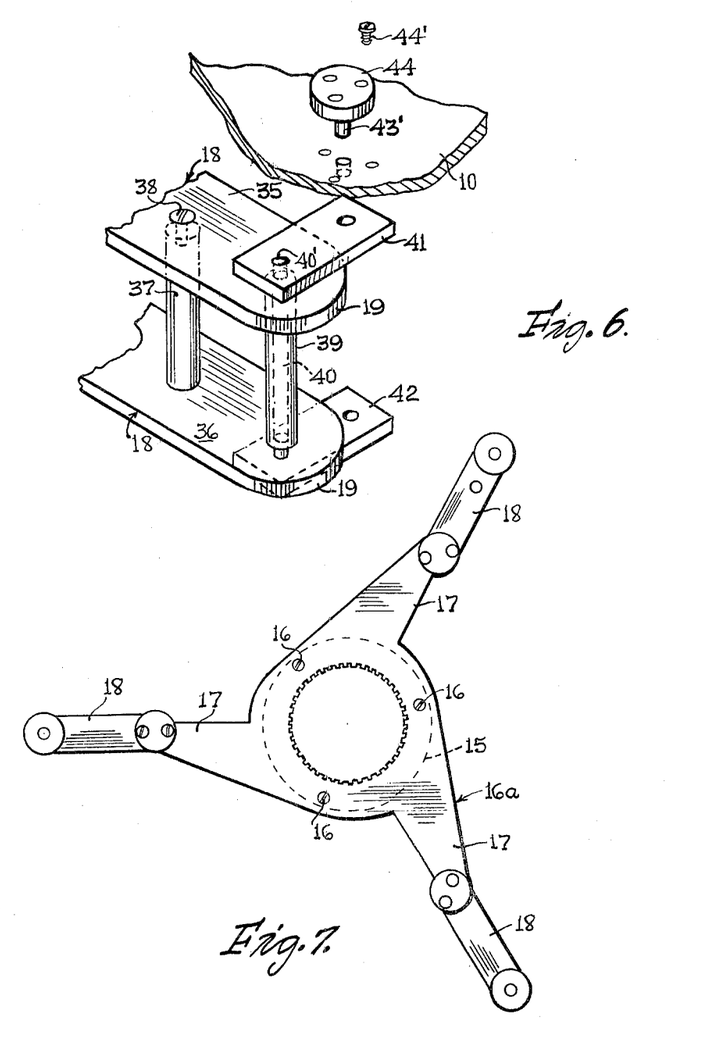
FIG. 6 is a fragmentary perspective view of a crank arm and pin connection as employed with certain of the cycling plates of my invention.
FIG. 7 is a plan view of one of the cycling plates as employed in the torque drive mechanism.
Figure 8:
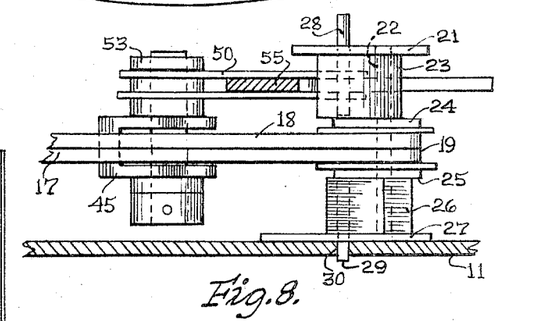
FIG. 8 is a fragmentary elevational sectional view taken on line 8—8 of FIG. 5.

Referring to FIG. 6, I show how the free ends 19 of the top and bottom cycling plates 16a and 16c respectively are pivotally supported. The connecting links 18 (specifically labeled 35 and 36) of the top and bottom cycling plates 16a and 16c are maintained in spaced parallel relation by a spacer 37 disposed therebetween and attached thereto by screws 38 or the like.

A similar spacer 39 is disposed between the free ends 19 of the plates 16a and 16c and has a supporting pin 40 journaled therethrough with its ends pivotally connected as at 40' to top and bottom crank plates 41 and 42. These crank plates 41 and 42 are then in turn pivotally connected between the front and rear plates 10 and 11 by crank pins 43' which are carried by a bearing 44 which in turn is fixedly connected to the front and rear plates 10 and 11 respectively by means of screws 44' or the like.

As shown by the drawings, the cycling plates 16a, b, and c, each comprise three substantially radially extending arms 17. The top and bottom cycling plates 16a and 16c are adapted to have their arms 17 connected to the housing of a drive device which in the preferred form is a cylinder 43. This connection is in the form of a trunnion mounting and therefore the cylinder 43 is pivotally connected between the arms 17 of the top cycling plate 16a and the bottom cycling plate 16c at a point where each of the arms 17 is angularly disposed to provide the connecting links 18 as seen in FIGS. 3 and 4.

Associated with each of the cylinders 43 is a piston 44. The free end of the piston 44 is provided with a bifurcated bracket 45 which in turn receives and has fixedly connected thereto the radially extending arms 17 of the center cycling plate 16 as shown in FIGS. 2, 3, 5, and 7. These cylinders 43 are of the push-pull type and may be actuated hydraulically or pneumatically. As such the cylinder 43 is provided with a first conduit 46 which is connected to one end 47 of the cylinder 43 and a second conduit 48 which is connected to the opposite end 49 of the cylinder 43. Thus by the passage through either of the conduits 46 and 48 of a driving force, the piston 44 is adapted to be reciprocally moved into and out of the cyinder 43. The cylinder 43 with its piston 44 is of a well-known commercial type and makes up no part of this invention except as to its operational characteristics as combined with the specific structure described herein.

Figure 3:
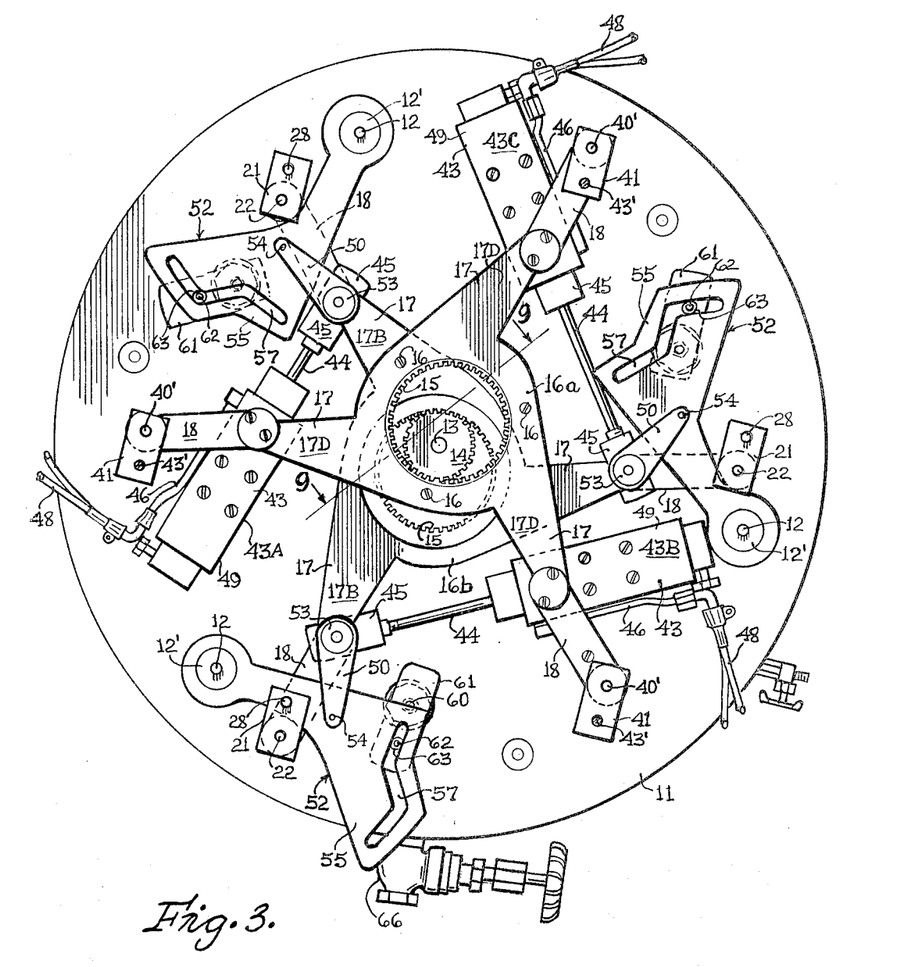
FIG. 3 is a top plan view of a heavy torque drive mechanism as shown in FIG. 1 with the top cover plate removed.
Figure 4:
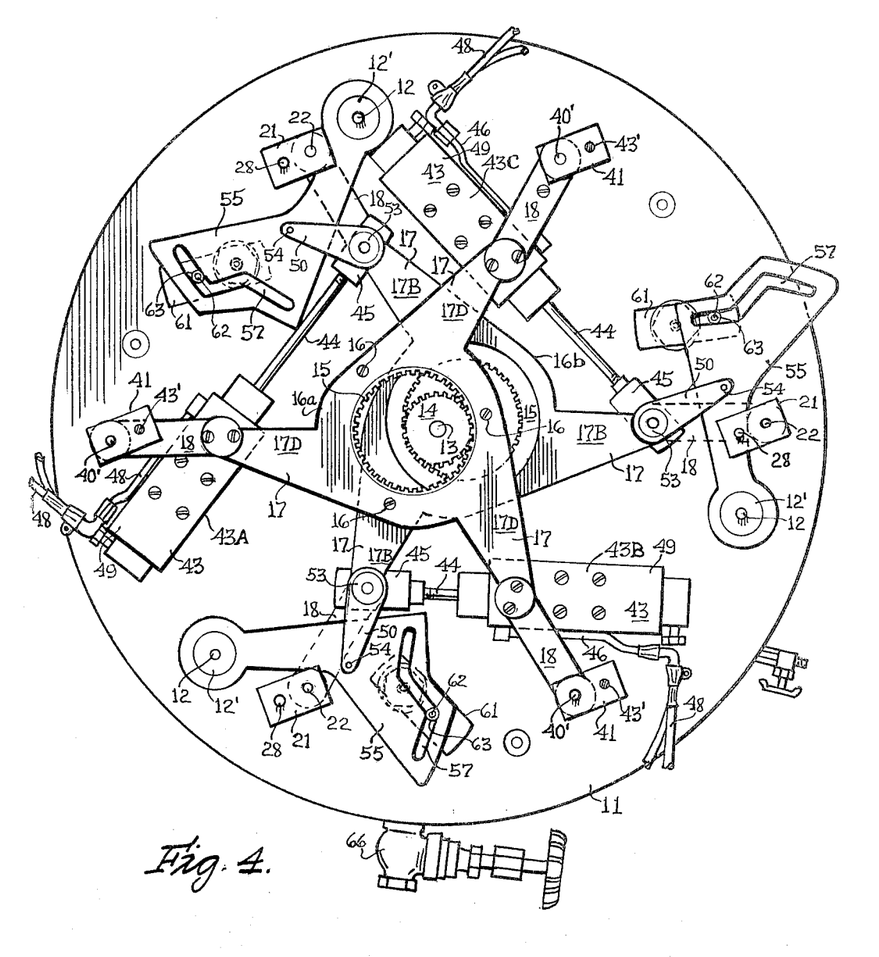
FIG. 4 is a top plan view of a heavy torque drive mechanism similar to FIG. 3 but showing the parts thereof in a partial actuated condition.

As viewed in FIGS. 3 and 4 and fragmentarily shown in FIG. 5, each of the radial arms 17 of the middle cycling plate 16b, at a point where the piston clevis 45 is connected thereto, is connected by a link 50 to a valve switching means 52. The links 50 are by a suitable bearing 53 pivotally connected to the top surface of the arms 17 and by a pivot pin 54 pivotally connected to the valve switching means 52. The valve switching means 52 comprises a longitudinally extending horizontally disposed triangularly shaped plate 55 which is pivotally journaled as at 56 upon an adjacent spacer 12' which in turn is disposed between the front and rear plates 10 and 11. The plate 55 adjacent the free end thereof is provided with a substantially Z-shaped slot 57.

Figure 2:
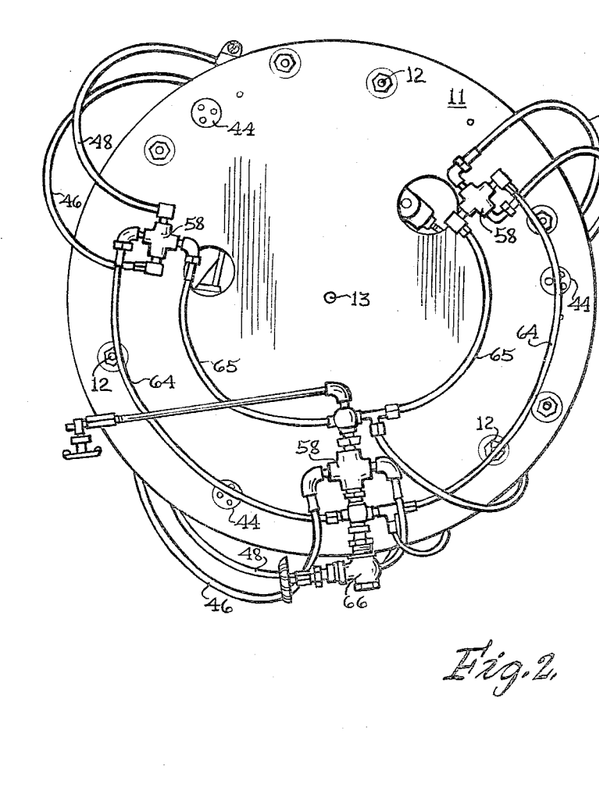
FIG. 2 is a rear plan view of the heavy torque drive mechanism embodying my invention.

Each of the cylinders 43 is adapted to be operated by a valve 58 which is positioned on the outer side of the rear plate 11 as seen in FIG. 2. These valves 58 are provided with a laterally extending bushing which is adapted to project through a suitable opening formed in the rear plate 11 (not shown). The valves 58 are attached to the rear plate 11 by a nut 59, which is threaded on to the valve bushing as shown in FIG. 5. Extending through the bushing of the valve 58 is a valve stem 60. This valve stem 60 has fixedly attached thereto an actuating lever 61. This lever 61 is in reality an actuating handle for the valve 58 and is mounted so as to be disposed between the front and rear plates 10 and 11 and adjacent the free end of the valve switching plate 55.

The actuating lever 61 supports a laterally projecting pin 62 which carries a roller 63 which in turn is adapted to be projected into the slot 57 formed in the switching plate 55. The direction of the pivotal action of the lever 61 is effected by the roller 63 as the same is caused to be moved through the slot 57 of the switching plate 55 when such plate 55 is reciprocally pivoted about its pivotal connection 56 by relative movement of the cycling plate 16b as hereinafter described.

As shown in FIG. 2, each of the valves 58 are connected by conduits 64 and 65 to a control valve 66 which in turn may be connected to a source of either hydraulic or pneumatic operating pressure.

Referring to FIGS. 3 and 4, I show therein the positions of the actuating elements of my invention starting from a first position, as shown in FIG. 3, through an actuated position after a half cycle of operation in FIG. 4.

In taking the starting position as shown in FIG. 3 it is readily seen that certain of the pistons 44 of the cylinders 43 are each in different degrees of operation. In the embodiment of the invention, as shown by the drawings, the cycling plates 16a, 16b, and 16c are adapted to be rotated in a clockwise direction.

The cycling plates 16a, 16b and 16c are adapted to be rotated through a circular path with the cycling plates 16a and 16c so positioned relative to the shaft 13 that they are 180° out of phase with respect to plate 16b. The circular movement of the cycling plates is controlled by the limited circular paths taken by the crank plates 21, 27, and 41, 42, which are pivotally connected to the free ends of the connecting links 18 formed as a part of the radially extending arms 17 of such cycling plates. These crank plates 21, 27, and 41, 42 are in turn limited for movement through a circular path about their respective pivot pins 28, 29 and 43', which are in turn fixedly arranged between the front and rear plates 10 and 11. By such an arrangement, the cylinders 43 are constructed and connected to the radial arms 17 of the cycling plates 16a, 16b, and 16c, in such a manner that they exert a moving force in one direction upon the middle cycling plate 16b and simultaneously an opposite reactionary force upon the cyling plates 16a and 16c.

The operational condition of each of the valves 58 is determined by the position of the actuating levers 61 which are connected to each of the valve stems 60 of the valves 58. The position of the actuating lever 61 is in turn determined by the pivotal movement of the valve switching means 52.

When the control valve 66 is open to admit a power source simultaneously to each of the valves 58 through the respective network of conduits 64 and 65, the cycling plates 16a, 16b and 16c are immediately set into cyclical movement about the shaft 13 in the following manner.

In the position of the device as shown in FIG. 3, the valve switching means 52 associated with the cylinder 43A is such that the power supply is admited through the conduit 48 into the cylinder 43A so as to effect expulsion of its piston 44. As noted, the piston 44 is connected to one arm 17B of the cycling plate 16b while the cylinder 43A is itself connected to one arm 17D of the cycling plate 16a. The end of the piston 44 is also connected to the pivotal crank plate 21 while the cylinder 43A is likewise connected to a crank plate 41.

The expelling movement of the piston 44 forces the end of arm 17B of cycling plate 16b in a clockwise cyclical path with its distance and directional movement controlled by the cycle prescribed by the crank plate 21 as it is forced to rotate about its fixed pivot pin 28. The movement of the cylinder 43A is in a rotational direction, the distance and directional movement being controlled by the cyclical path prescribed by the crank plate 41 as it rotates about its fixed pivot pin 43'. As the plates 16a and 16b have their geared sectors in engagement with opposite side portions of the pinion gear 14, they, the plates, will have clockwise rolling contact with such gear 14.

Thus, when the piston 44 approaches a complete expulsion from the cylinder 43A, the cylinder 43A and the end of the piston 44 will have assumed the positions shown in FIG. 4, which positions are the result of their independent but coordinated circular movement. This circular movement in turn imparts continuous rolling contact of the internal gear rings 15 of each of the cycling plates 16a and 16b upon opposite side portions of the pinion gear 14 of the shaft 13 so as to rotate the same in a clockwise direction.

At the end of the expulsion of the piston 44 from cylinder 43A, the switching means 52 associated therewith through its link 50, connection to the end of the piston 44 and arm 17B of cycling plate 16b, will have pivoted so that the valve's stem 60 as carried by the switching actuating lever 61 will reverse the operation of the valve 58 so as to have the power supply function in the cylinder 43A so as to retract the piston 44.

Simultaneously with the operation of cylinder 43A, the valve 58 of cylinder 43B was conditioned by its associated switching means 52 so as to effect the retraction of its piston 44.

The piston 44 of cylinder 43B has its free end connected to the arm 17B of the cycling plate 16b in the same manner as was the piston 44 of cylinder 43A.

As the cylinder 43B like the cylinder 43A is connected to the free end of the arm 17D of cycling plate 16a it too moves in a similar cyclical path coordinated to that cyclical path of the cylinder 43A as determined by the pivotal movement of the crank plates 41 connected to each of the cylinders.

The connection between the arm 17B and piston 44 of cylinder 43B is forced to move through a cyclical path similar to that of the piston 44 of cylinder 43A so that notwithstanding the opposite movements of the piston 44 relative to their respective cylinders, the forced rolling contact of the cycling plate 16b is a result of the coordinated movement of each of the free ends of the pistons 44, and the rolling contact of the plate 16a is a result of the coordinated movement of the cylinders 43A and 43B.

When the piston 44 of the cylinder 43B is completely retracted, its movement will have effected the pivoting of its associated switching means 55 and through the action of the switch actuating lever 61, the valve stem 60 will reverse the action of the valve 58.

The same operation and cyclical movement of the cylinder 43C, as well as the free end of its piston 44 is accomplished by its switching means 55 and its valve 58.

As seen in FIG. 3, the piston 44 of cylinder 43C has approached its full expulsion and its switching means 52, has actuated the valve 58 associated therewith so that as seen in FIG. 4, the piston 44 is being retracted into the cylinder 43C.

From the foregoing, it is apparent that all of the cylinders 43A, 43B and 43C are connected to identical arms 17D of the cycling plate 16a and such point of connection therebetween is caused to rotate in a coordinated cyclical direction and simultaneously the ends of the pistons 44 of each of the cylinders are connected to identical arms 17B of the cycling plate 16b so that such point of connection, as well as each of the switching means 55 is rotated in a coordinated cyclical direction effecting the clockwise rotation of the shaft 13. By reason of the fact that the top and bottom cycling plates 16a and 16c are disposed 180° about the shaft 13 relative to the middle cycling plate 16b, their circular movement about such shaft 13 is in effect in the same direction but on opposite sides of the shaft 13. This 180° displacement permits a pure coupling on the shaft 13 and its pinion gears 14. As shown in FIGS. 3 and 4, the broad teeth of the gear plates 15 on the top cycling plate 16a are on one side of the pinion gears 13, while the tooth engagement of the gear plates 15 carried by the middle cycling plate 16b is on the opposite side of the pinion gears 14. By this arrangement a continuous and positive meshing of gears is achieved which meshing includes a large number of gear teeth thereby effecting a true and positive coupling upon the shaft 13.

It should be noted that all of the crank plates 21, 27, and 41, 42 are relatively positioned with respect to the arms 17 of the plates so as to impart the proper directional movement through a circular path onto the cycling plates. The operation of the cylinders 43 is controlled by the valve switching means 52. As the cycling plates move through their circular path about the shaft 13, the valve switching means 52 through its pivotal switching plates 55 will effect controlling the direction of the driving force, be it either pneumatic or hydraulic, into the respective ends of the cylinders 43 for expelling or retracting the pistons 44 thereof.

Comparing the position of the valve switching plates 55 as shown in FIG. 3 with the position of the same valve switching plates 55 as shown in FIG. 4, it is readily apparent that as the same are caused to reciprocally pivot about their fixed end connection, the rollers 63, which project into the Z-shaped slots 57 formed in the free ends of the plates 55, have caused the actuating levers 61 to be pivoted into different positions. As each of the levers 61 is connected to a valve stem 60 of its associated valve 58 its pivoted position will determine the flow of operating force through such valves 58, which in turn determines through which of the conduits 46 or 48 such operating force is transmitted. As these conduits 46 and 48 are connected to opposite ends of the cylinders 43, they produce opposite directional operation thereof.

The heretofore described embodiments of structural elements by which a heavy torque drive is established through a pure coupling upon a driven shaft inherently possesses many desirable advantages. As each of the cycling plates is confined to cycle through a predetermined circular path by the three equally spaced and especially designed crank plates, spaced at the outermost radius from the final drive shaft, the torque reaction from the driven shaft will be carried by such crank plates thereby eliminating the necessity of providing expensive and delicate bearings.

The use of internal gearing in establishing the pure coupling arrangement allows the torque load to be carried by a plurality of teeth which produces a more positive and more direct proportion of torque upon the driven shaft. The pure coupling torque drive assembly is readily adaptable to prime movers of all types as it provides a high torque drive which has little gyroscopic or tumbling reaction.

The device may be utilized in installations that require large starting torque, instant reversing, locking and holding features and no back lash, such devices being radio antennae drives or tracking devices, rocket launchers and gun turrets. As the drive shaft may be of any diameter and hollow, the unit possesses the desirable feature of having a torque drive shaft through which the assembly of pipes or well casings for well drilling and the like may be readily passed.

The open center drive shaft may also accommodate a propeller shaft thereby making the unit usable in extremely large drive applications such as in ships and mill rolls and the like. The employment of two units may readily replace the conventional transmission and differential as used for motive power today on heavy tractors and the like.

All of these features and applications are inherent from the novel structural arrangement shown and described without departing from the spirit of this invention.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A torque drive mechanism including a driven shaft,
 (a) a plurality of shaft driving means each having formed therein a center circular opening through which said shaft projects,
 (b) said shaft driving means being eccentrically positioned about said shaft with a peripheral sector of the center opening of each engaging opposite corresponding peripheral sectors of said shaft so as to form a drive coupling therebetween,
 (c) each of said shaft driving means providing radial arms, with the arms of one of said shaft driving means extending in an opposite and tangential direction with respect to the radial arms of said other driving means,
 (d) pivotal means connected to the free ends of said arms for directing said shaft driving means in a continuous circular path about said shaft while maintaining the coupling connection therebetween,
 (e) means connected between and operable on said arms for driving said arms through a circular path about their pivotal connecting means and said shaft driving means about said shaft,
 (f) means for effecting the operation of said driving means, and
 (g) means controlled by said last named means for operating said driving means.

2. A torque drive mechanism including a driven shaft,
 (a) a plurality of substantially flat cycling plates each having formed therein a center circular opening through which said shaft projects,
 (b) said cycling plates being eccentrically positioned about said shaft with a peripheral sector of the center opening of each engaging opposite corresponding peripheral sectors of said shaft so as to form a drive coupling therebetween,
 (c) each of said cycling plates providing radial arms, with the arms of one of said cycling plates extending in an opposite and tangential direction with respect to the radial arms of said other driving means,
 (d) pivotal means connected to the free ends of said arms for directing said cycling plates in a continuous circular path about said shaft while maintaining the coupling connection therebetween,
 (e) means connected between and operable on said arms for driving said arms through a circular path about their pivotal connecting means and said cycling plates about said shaft,
 (f) means for effecting the operation of said driving means, and
 (g) means controlled by said last named means for operating said driving means.

3. A torque drive mechanism including a driven shaft,
 (a) a plurality of shaft driving means each having formed therein a center circular opening through which said shaft projects,
 (b) said shaft driving means being eccentrically positioned about said shaft with a peripheral sector of the center opening of each engaging opposite corresponding peripheral sectors of said shaft so as to form a drive coupling therebetween,
 (c) each of said shaft driving means providing radial arms, with the arms of one of said shaft driving means extending in an opposite and tangential direction with respect to the radial arms of said other driving means,
 (d) pivotal crank plates connected to the free ends of said arms for directing said shaft driving means in a continuous circular path about said shaft while maintaining the coupling connection therebetween,
 (e) means connected between and operable on said arms for driving said arms through a circular path about their pivotal crank plates and said shaft driving means about said shaft,
 (f) means for effecting the operation of said driving means, and
 (g) means controlled by said last named means for operating said driving means.

4. A torque drive mechanism including a driven shaft,
 (a) a plurality of substantially flat cycling plates each having formed therein a center circular opening through which said shaft projects,
 (b) said cycling plates being eccentrically positioned about said shaft with a peripheral sector of the center opening of each engaging opposite corresponding peripheral sectors of said shaft so as to form a drive coupling therebetween,
 (c) each of said cycling plates providing radial arms, with the arms of one of said cycling plates extending in an opposite and tangential direction with respect to the radial arms of said other driving means,
 (d) pivotal crank plates connected to the free ends of said arms for directing said cycling plates in a continuous circular path about said shaft while maintaining the coupling connection therebetween,
 (e) means connected between and operable on said arms for driving said arms through a circular path about their pivotal crank plates and said cycling plates about said shaft,
 (f) means for effecting the operation of said driving means, and
 (g) means controlled by said last named means for operating said driving means.

5. A torque drive mechanism including a driven shaft,
 (a) a plurality of shaft driving means each having formed therein a center circular opening through which said shaft projects,
 (b) said shaft driving means being eccentrically positioned about said shaft with a peripheral sector of the center opening of each engaging opposite corresponding peripheral sectors of said shaft so as to form a drive coupling therebetween,
 (c) each of said shaft driving means providing radial arms with the arms of one of said shaft driving means extending in an opposite and tangential direction with respect to the radial arms of said other driving means,
 (d) pivotal means connected to the free ends of said arms for directing said shaft driving means in a continuous circular path about said shaft while maintaining the coupling connection therebetween,
 (e) push-pull cylinders connected between and operable on said arms for driving said arms through a circular path about their pivotal connecting means and said shaft driving means about said shaft,
 (f) means for effecting the operation of said cylinders, and
 (g) means controlled by said last named means for operating said cylinders.

6. A torque drive mechanism including a driven shaft,
 (a) a plurality of substantially flat cycling plates each having formed therein a center circular opening through which said shaft projects,
 (b) said cycling plates being eccentrically positioned about said shaft with a peripheral sector of the center opening of each engaging opposite corresponding peripheral sectors of said shaft so as to form a drive coupling therebetween,
 (c) each of said cycling plates providing radial arms, with the arms of one of said cycling plates extending in an opposite and tangential direction with respect to the radial arms of said other driving means,
 (d) pivotal crank plates connected to the free ends of said arms for directing said cycling plates in a continuous circular path about said shaft while maintaining the coupling connection therebetween.
(e) push-pull cylinders connected between and operable on said arms for driving said arms through a circular path about their pivotal crank plates and said cycling plates about said shaft,
(f) means for effecting the operation of said cylinders, and
(g) means controlled by said last named means for operating said cylinders.

7. A torque drive mechanism including a driven shaft,
(a) a plurality of shaft driving means each having formed therein a center circular opening through which said shaft projects,
(b) said shaft driving means being eccentrically positioned about said shaft with a peripheral sector of the center opening of each engaging opposite corresponding peripheral sectors of said shaft so as to form a drive coupling therebetween,
(c) each of said shaft driving means providing radial arms with the arms of one of said shaft driving means extending in an opposite and tangential direction with respect to the radial arms of said other driving means,
(d) pivotal means connected to the free ends of said arms for directing said shaft driving means in a continuous circular path about said shaft while maintaining the coupling connection therebetween,
(e) push-pull cylinders connected between and operable on said arms for driving said arms through a circular path about their pivotal connecting means and said shaft driving means about said shaft,
(f) means connected to said arms and operated thereby for effecting the operation of said cylinders, and
(g) valve members controlled by said last named means for operating said cylinders.

8. A torque drive mechanism including a driven shaft,
(a) a plurality of shaft driving means each having formed therein a center circular opening through which said shaft projects,
(b) said shaft driving means being eccentrically positioned about said shaft with a peripheral sector of the center opening of each engaging opposite corresponding peripheral sectors of said shaft so as to form a drive coupling therebetween,
(c) each of said shaft driving means providing radial arms with the arms of one of said shaft driving means extending in an opposite and tangential direction with respect to the radial arms of said other driving means,
(d) pivotal means connected to the free ends of said arms for directing said shaft driving means in a continuous circular path about said shaft while maintaining the coupling connection therebetween,
(e) push-pull cylinders connected between and operable on said arms for driving said arms through a circular path about their pivotal connecting means and said shaft driving means about said shaft,
(f) switch plates connected to said arms and operated thereby for effecting the operation of said cylinders, and
(g) valve members controlled by said switch plates for operating said cylinders.

9. A torque drive mechanism including a driven shaft,
(a) a plurality of substantially flat cycling plates each having formed therein a center circular opening through which said shaft projects,
(b) said cycling plates being eccentrically positioned about said shaft with a peripheral sector of the center opening of each engaging opposite corresponding peripheral sectors of said shaft so as to form a drive coupling therebetween,
(c) each of said cycling plates providing radial arms, with the arms of one of said cycling plates extending in an opposite and tangential direction with respect to the radial arms of said other driving means,
(d) pivotal crank plates connected to the free ends of said arms for directing said cycling plates in a continuous circular path about said shaft while maintaining the coupling connection therebetween,
(e) push pull cylinders connected between and operable on said arms for driving said arms through a circular path about their pivotal crank plates and said cycling plates about said shaft,
(f) switch plates connected to said arms and operated thereby for effecting the operation of said cylinders, and
(g) valve members controlled by said switch plates for operating said cylinders.

10. A torque drive mechanism including a driven geared shaft,
(a) a plurality of cycling plates each having formed therein an internally geared center circular opening,
(b) said cycling plates being eccentrically positioned about said shaft with a peripheral geared sector of the center opening of each plate engaging opposite corresponding peripheral geared sectors of said shaft so as to form a drive coupling therebetween,
(c) each of said cycling plates having three radial arms extending tangentially with respect to the center openings formed in said plates, with the end of the arms of one plate converging toward the ends of the arms of another plate so as to form a set of spaced ends between said plates,
(d) a plate cycling means connected between the end of the arms of each set,
(e) said plate cycling means adapted to exert a moving force in one direction of one end of one of the arms in the set and a moving force in an opposite direction on the other end of the other of said arms,
(f) means for actuating said plate cycling means, and
(g) means connected to and operable by said arms for controlling actuation of said actuating means.

11. A torque drive mechanism including a driven geared shaft,
(a) a plurality of cycling plates each having formed therein an internally geared center circular opening,
(b) said cycling plates being eccentrically positioned about said shaft with a peripheral sector of the center opening of each plate engaging opposite corresponding peripheral geared sectors of said shaft so as to form a drive coupling therebetween,
(c) each of said cycling plates having three radial arms extending tangentially with respect to the center openings formed in said plates, with the end of the arms of one plate converging toward the ends of the arms of another plate so as to form a set of spaced ends between said plates,
(d) a cylinder including a reciprocally moving piston connected between the ends of the arms of each set for moving said cycling plates in a continuous circular path about said shaft,
(e) said cylinder adapted to exert a moving force in one direction on one end of one of the arms in said set with the piston simultaneously exerting a moving force in an opposite direction on the other end of the other of said arms,
(f) means for actuating cylinders means, and
(g) means connected to and operable by said arms for controlling actuation of said actuating means.

12. A torque drive mechanism including a driven geared shaft,
(a) a plurality of cycling plates each having formed therein an internally geared center circular opening,
(b) said cycling plates being eccentrically positioned about said shaft with a peripheral sector of the center opening of each plate engaging opposite corresponding peripheral geared sectors of said shaft so as to form a drive coupling therebetween,
(c) each of said cycling plates having three radial arms extending tangentially with respect to the center openings formed in said plates, with the end of the arms of one plate converging toward the ends of the arms of another plate so as to form a set of spaced ends between said plates,
(d) a cylinder including a reciprocally moving piston connected between the ends of the arms of each set for moving said cycling plates in a continuous circular path about said shaft,
(e) said cylinder adapted to exert a moving force in one direction on one end of one of the arms in said set with the piston simultaneously exerting a moving force in an opposite direction on the other end of the other of said arms,
(f) valve members for actuating said cylinders,
(g) means connected to and operable by said arms for controlling actuation of said actuating means.

13. A torque drive mechanism including a geared shaft,
(a) a plurality of cycling plates each having formed therein an internally geared center circular opening,
(b) said cycling plates being eccentrically positioned about said shaft with a peripheral sector of the center opening of each plate engaging opposite corresponding peripheral geared sectors of said shaft so as to form a drive coupling therebetween,
(c) each of said cycling plates having three radial arms extending tangentially with respect to the center openings formed in said plates, with the end of the arms of one plate converging toward the ends of the arms of another plate so as to form a set of spaced ends between said plates,
(d) a cylinder including a reciprocally moving piston connected between the ends of the arms of each set for moving said cycling plates in a continuous circular path about said shaft,
(e) said cylinder adapted to exert a moving force in one direction of one end of one of the arms in said set with the piston simultaneously exerting a moving force in an opposite direction on the other end of the other of said arms,
(f) valve members for actuating said cylinders, and
(g) switching elements connected to and operable by said arms for controlling the actuation of said valve members.

References Cited by the Examiner

UNITED STATES PATENTS

| 749,585 | 1/1904 | Shotwell et al. | 91—186 |
| 1,220,173 | 3/1917 | Borras et al. | 91—186 |
| 1,609,388 | 12/1926 | Tebaldi | 91—186 |

MARTIN P. SCHWADRON, *Primary Examiner.*

SAMUEL LEVINE, *Examiner.*

P. E. MASLOUSKY, *Assistant Examiner.*